United States Patent
Clark et al.

(10) Patent No.: US 6,189,148 B1
(45) Date of Patent: Feb. 13, 2001

(54) METHODS AND CIRCUITS USING FREQUENCY SHIFT KEYING MODULATION TO TRANSFER DATA OVER TRANSMISSION LINES SIMULTANEOUS WITH TELEVISION SIGNALS

(75) Inventors: Jerry R. Clark, Farmers Branch; Todd D. Cutler, Howe; Lawrence D. Monaco, Richardson, all of TX (US); Christopher J. Schultheiss, 419 Quay Assissi, New Smyrna Beach, FL (US) 32169

(73) Assignees: Douglas G. Brown, Cherryville, NC (US); Christopher J. Schultheiss, New Smyrna Beach, FL (US)

( * ) Notice: Under 35 U.S.C. 154(b), the term of this patent shall be extended for 0 days.

(21) Appl. No.: 09/239,215

(22) Filed: Jan. 28, 1999

(51) Int. Cl.[7] .............................. H04N 7/18; H04N 7/16
(52) U.S. Cl. ............................. 725/78; 725/148
(58) Field of Search .................. 348/6, 8, 9, 12; 455/6.3, 3.1, 6.1, 5.1, 66; 375/303, 272, 334; H04N 1/00, 1/11

(56) References Cited

U.S. PATENT DOCUMENTS

| | | | |
|---|---|---|---|
| 4,443,884 | 4/1984 | Swarz | 375/121 |
| 4,688,249 | 8/1987 | Hayes et al. | 380/20 |
| 5,255,086 | 10/1993 | McMullan, Jr. et al. | 358/86 |
| 5,321,846 * | 6/1994 | Yokota et al. | 455/4.2 |
| 5,361,091 | 11/1994 | Hoarty et al. | 348/7 |
| 5,657,414 | 8/1997 | Lett et al. | 386/35 |
| 5,805,806 * | 9/1998 | McArthur | 395/200.8 |

FOREIGN PATENT DOCUMENTS

| | | |
|---|---|---|
| 0727909A2 | 8/1996 | (EP) . |
| 0822718A1 | 2/1998 | (EP) . |
| WO 97/13368 | 4/1997 | (WO) . |
| WO 97/20413 | 6/1997 | (WO) . |
| WO 98/03012 | 1/1998 | (WO) . |

OTHER PUBLICATIONS

International Search Report, dated Jul. 13, 2000.

* cited by examiner

*Primary Examiner*—Andrew Faile
*Assistant Examiner*—Vivek Srivastava
(74) *Attorney, Agent, or Firm*—Myers Bigel Sibley & Sajovec

(57) ABSTRACT

Data is transferred using frequency shift keying modulation in a frequency range that is not within a television signal frequency range used to conduct the television signal over the transmission line. Consequently, the present invention may allow the television signal and the data to be conducted on the same cabling. The frequency shift keying modulation is provided by generating a modulated data signal based on information included in the data. For example, the frequency shift keying modulation generates a modulated data signal at a first frequency when the data is equal to a logical 0 and at a second frequency when the data is equal to a logical 1.

12 Claims, 2 Drawing Sheets

METHODS AND CIRCUITS USING FREQUENCY SHIFT KEYING MODULATION TO TRANSFER DATA OVER TRANSMISSION LINES SIMULTANEOUS WITH TELEVISION SIGNALS

FIELD OF THE INVENTION

The present invention relates to the field of communications in general and more particularly to serial data transmission.

BACKGROUND OF THE INVENTION

As the popularity of cable television services increases, new consumer devices may become available for home use. For example, new types of consumer devices such as cable ready televisions, cable tuners, and video cassette recorders may be connected to cabling which carries the transmission of the cable television services for use by consumers in their homes. As the number of consumer devices used in the home increases, the cabling needed inside the home may also increase and become unwieldy. As a result, the cabling may be integrated into the structure of the home, for example in the walls and floors. It is known to use coaxial cable having an impedance of 75 ohms in some cable systems for the transmission of the cable television services.

The cabling may conduct television signals and other signals which include the cable television services, and Direct Current (DC) voltages or Alternating Current (AC) voltages for controlling the consumer devices. For example, a television signal and a DC voltage may be transmitted over the cabling to provide a video signal and a DC voltage for controlling a cable tuner.

Other devices, such as Personal Computers (PCs), are also used in consumers' homes. Some of these devices may be capable of communicating with other devices, such as the consumer devices described above. Unfortunately, separate wiring may be needed to provide the communications between the devices. For example, a serial data cable may be needed to connect two PCs. Unfortunately, if the PCs are located in different areas of the home, the serial data cable may need to be long which may make the serial data cable expensive and unwieldy. Therefore, a need exists to further improve communications between devices such as consumer devices and PCs.

SUMMARY OF THE INVENTION

It is, therefore, an object of the present invention to allow an improvement in the transfer of data between devices within a building.

It is another object of the present invention to allow improvement in transferring data over transmission lines which conduct television signals.

These and other objects of the present invention are provided by transferring data using frequency shift keying modulation in a frequency range that is not within a television signal frequency range used to conduct the television signal over the transmission line. The present invention may thereby allow the same cabling to be used to transfer data between devices. In one embodiment, the devices are located in the same building, such as a home. Consequently, the present invention may provide a less expensive and convenient way to transfer data between devices using the same cable used to conduct the television signal. According to conventional systems, the transfer may be performed over separate cabling which may be unwieldy and expensive.

The frequency shift keying modulation is provided by generating a modulated data signal based on information included in the data. For example, the frequency shift keying modulation generates a modulated data signal at a first frequency when the data is equal to a logical 0 and at a second frequency when the data is equal to a logical 1. In one embodiment, the first frequency is about 800 KHz and the second frequency is about 1 MHz.

Frequency shift keying modulation may provide a reduction in the cost of transferring the data. In particular, the frequency shift keying modulation may be embodied using relatively few components. In contrast, some conventional data transfers are performed using phase shift keying modulation which may be more expensive than a system according to the present invention.

DETAILED DESCRIPTION OF THE PREFERRED EMBODIMENTS OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete, and will fully convey the scope of the invention to those skilled in the art.

The phrase "television signal" as used herein includes signals formatted for display on television sets such as National Television System Committee (NTSC) format video provided in some conventional cable television systems. NTSC formatted video includes 525 lines at a horizontal frequency of 15.734 KHz and a vertical frequency of 60 Hz. As described herein the phrase "transmit operation" refers to the transmission of data from a PC to a set top box over a transmission line. Similarly, the phrase "receive operation" refers to the transmission of data from the set top box to the PC. Like numbers refer to like elements throughout.

Figure 1:
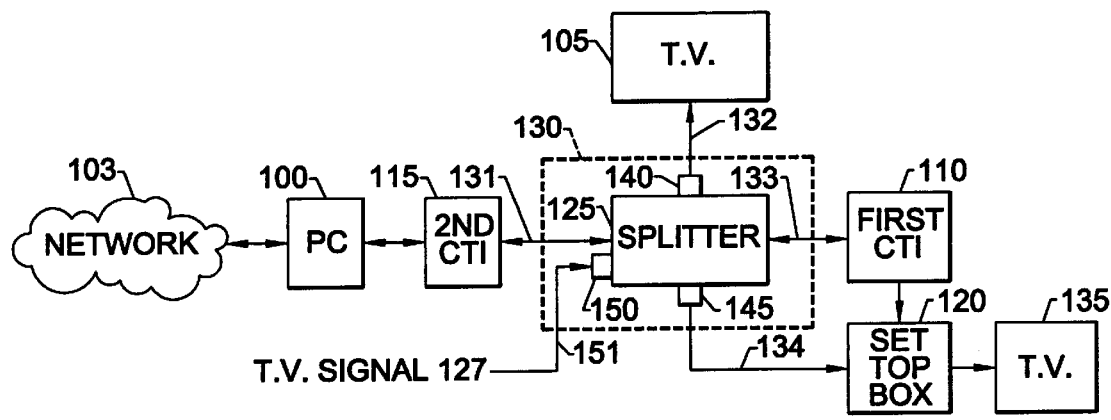
FIG. 1 is a block diagram of a system utilizing a plurality of cable transfer interfaces to transfer data over a transmission line according to the present invention.

FIG. 1 is a block diagram of a system utilizing a plurality of cable transfer interfaces 110, 115 to transfer data over a transmission line 130 according to the present invention. According to FIG. 1, data is transferred between a Personal Computer 100 and a set top box 120 over the transmission line 130, such as a coaxial cable, used to conduct a television signal. The PC 100 can access a network 103, such as the internet, which stores information that may be requested by a user. The set top box 120 controls the display of a television 135 in response to commands issued by a user to the set top box 120. Some commands may cause the set top box 120 to request information, such as broadcast times, from the PC 100. In response, the PC 100 may retrieve the information from the network 103 and transmit the information to the set top box 120. Although the embodiment of FIG. 1 shows the PC 100 connected to the set top box 120 via the transmission line 130, it will be understood that other devices may be used. For example, in another embodiment, two PCs may be connected via the transmission line 130 to allow the transfer of serial data between the PCs. The set top box 120 may be a device such as those described in U.S. patent application Ser. No. 09/005,269 entitled "Methods and Systems for Providing Television Related Services Via a Networked Personal Computer" which is incorporated herein by reference. In one embodiment, the cable transfer interface is powered by a separate DC power supply.

Data is transferred between the PC 100 and the set top box 120 in a half-duplex fashion that may be controlled by a computer program running on one or more processors. For example, the PC 100 and the set top box 120 may each include one or more processors that run computer programs to coordinate the transfer of data over the transmission line 130. In operation, a transmission by either the PC 100 or the set top box 120 stops to allow the other device to transmit. The half-duplex control of the PC 100 and the set top box 120 is performed according to techniques known to those having skill in the art. The transmission line 130 includes a splitter 125 that distributes a television signal 127 to a plurality of devices via respective cables 131–134 as shown in FIG. 1. The transmission line 130 includes conventional cabling such as that installed in the walls and floors of houses.

For simplicity, the transmit operation is described first, wherein data is transmitted from the set top box 120 to the PC 100 such as when the user requests programming information to be displayed. Second, a receive operation is described in which data is transmitted from the PC 100 to the set top box 120 such as when the PC 100 responds to the request by transferring the program information to the set top box 120.

In the transmit operation, the set top box 120 transmits data to a first cable transfer interface (CTI) 110 using an interface format such as an RS-232 serial interface standard, although other interface formats may be used as well. In one embodiment, a 9-pin serial data port on the set top box 120 is used to transmit and receive the data.

The first cable transfer interface 110 processes the data received from the set top box 120 using frequency shift keying modulation to provide a modulated data signal which is transmitted over the transmission line 130 which also conducts the television signal 127. However, the modulated data signal occupies a frequency range that is not within the television signal frequency range used to conduct the television signal.

The data transmitted by the first cable transfer interface 110 is transferred to the PC 100 through the splitter 125 over respective cables 133, 131. The splitter 125 distributes the television signal 127 to a television 105, the first cable transfer interface 110 and the set top box 120 via respective cables 132, 133, 134. Consequently, the cables 131, 134 conduct a distributed version of the television signal 127 and the data transmitted by the first cable transfer interface 110. Other devices, such as videocassette recorders or other devices known in the art may be used in place of the television 105. Direct Current (DC) blocking circuits 140, 145, 150 are used to filter DC signals transmitted on the cable 151 and fed back by T.V. 105 and set top box 120 onto the transmission line 130.

A second cable transfer interface 115 processes the data transmitted by the first cable transfer interface 110 to provide data to the PC 100 according to the interface format described above. In one embodiment, a 9-pin serial data port on the PC 100 is used to transmit and receive data between the PC 100 and the second cable transfer interface 115.

In the receive operation, data is transmitted from the PC 100 to the set top box 120, such as when the PC 100 responds to the request transmitted by the set top box 120. In particular, data is transmitted from the PC 100 to the second cable transfer interface 115 according to the interface format described above. The second cable transfer interface 115 processes the data to provide a second modulated data signal that is transmitted over the transmission line 130 to the first cable transfer interface 110. The first cable transfer interface 110 demodulates the data received from the PC 100 and provides data to the set top box 120 according to the interface format. The set top box 120 uses the data to control the display of a distributed version of the television signal 127 on the television 135 provided to the set top box 120 via the cable 134. In another embodiment, the same cable is used to provide the distributed version of the television signal 127 and the data to the first cable transfer interface 110 and the set top box 120.

Accordingly, cabling installed in houses can be used to transfer data between devices, such as PCs and set top boxes. For example, existing cabling can be used to connect a PC with a set top box, thereby allowing data to be transferred between the set top box and the PC. Moreover, the data transfer does not interfere with the television signal conducted over the same cable. The cabling can be installed in the floors and walls of the house, thereby making the connection between the devices less cumbersome and less expensive than adding a dedicated cable between the devices.

Figure 2:
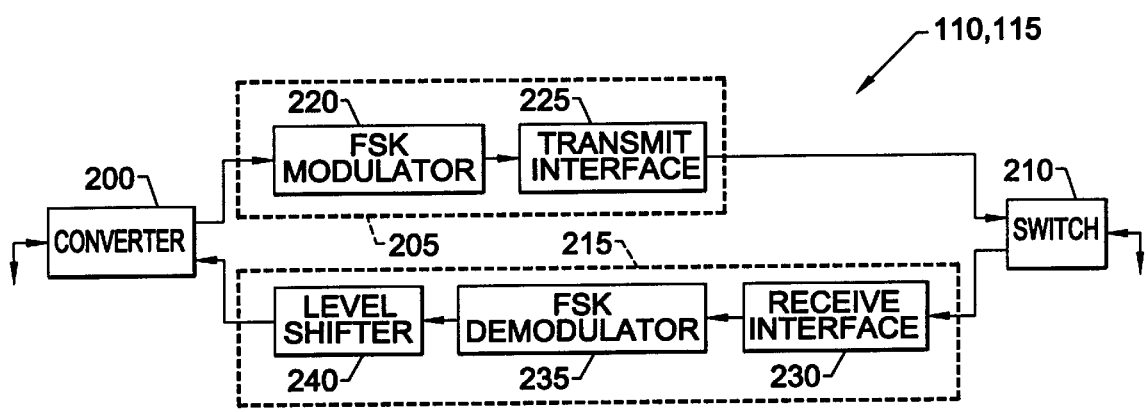
FIG. 2 is a block diagram of a cable transfer interface according to the present invention.

FIG. 2 is a block diagram of a cable transfer interface 110, 115 according to the present invention. In a transmit operation the data formatted according to the interface format is received by a converter 200 which converts the received data to Complementary Metal Oxide Semiconductor (CMOS) or Transistor to Transistor Logic (TTL) voltage levels (such as 0–5 volts) to provide a transmit format data signal. A transmitter 205 processes the transmit format data signal using Frequency Shift Keying (FSK) modulation to provide the transmit modulated data signal. The FSK modulation is performed using a frequency range that is not within a television signal frequency range used to conduct the television signal 127 over the transmission line 130. For example, in one embodiment the FSK modulation is performed using frequencies in a range between about 800 KHz and 1 MHz.

The transmit modulated data signal is provided to a switch 210 that electrically couples the transmit modulated data signal to the transmission line 130 under the control of the data provided to the cable transfer interface 110, 115. For example, a Ready To Send (RTS) signal included in an RS-232 interface can be used to control the switch direction to electrically couple the transmit modulated data signal to the transmission line 130.

The transmitter 105 includes an FSK modulator 220 that provides a modulated data signal using a frequency range that is not within the television signal frequency range used to conduct the television signal 127 over the transmission line 130. The FSK modulator 220 generates the modulated data signal at a frequency based on information included in the transmit format data signal. For example, in one embodiment the FSK modulator 220 generates the modulated data signal at a frequency of 800 KHz upon detecting that the transmit format data signal is equal to a logical 0. When the transmit format data signal transitions to a logical 1, the FSK modulator 220 generates the modulated data signal at a frequency of 1 MHz.

The modulated data signal is provided to a transmit interface 225 that provides the transmit modulated data signal to the switch 210. In particular, the transmit interface 225 drives the transmit modulated data signal over the transmission line 130 via the switch 210 to compensate for a variety of transmission line 130 configurations. For example, the transmit interface 225 may drive the transmit modulated data signal over a 200-foot transmission line 130 with an impedance in a range between about 25 ohms and 75 ohms.

In a receive operation data is transferred over the transmission line 130 to the switch 210 which electrically couples the data from the transmission line 130 to receiver 215 under the control of the data provided to the cable transfer interface 110, 115 to provide a receive modulated data signal. For example, a Ready To Send (RTS) signal included in an RS-232 interface can be used to control the switch direction to electrically couple the data from the transmission line 130 to the receiver 215.

The receiver 215 processes the receive modulated data signal to provide a demodulated data signal to the converter 200. In particular, the receiver 215 processes the receive modulated data signal using FSK demodulation over a frequency range that is not within a television signal frequency range used to conduct the television signal 127 over the transmission line 130 to provide a receive format data signal.

The converter 200 converts the receive format data signal to the interface format as described above. For example, in one embodiment the receive format data signal is converted from CMOS voltage levels to RS-232 voltage levels.

The receiver 205 includes a receive interface 230 that matches the impedance of the cable transfer interface 110, 115 to the transmission line 130 to provide a receive modulated data signal. For example, in one embodiment, the receive interface 230 provides a 75 ohm termination for the transmission line 130. The receiver 205 also includes an FSK demodulator 235 that provides a demodulated data signal using a frequency range that is not within the television signal frequency range used to conduct the television signal 127 over the transmission line 130 to provide the demodulator data signal. For example, in one embodiment the FSK demodulator 235 generates a logical 0 upon demodulating the modulated data signal at a frequency of 800 KHz. The FSK demodulator 235 generates a logical 1 upon demodulating the modulation data signal at a frequency of 1 Mhz.

Figure 3:
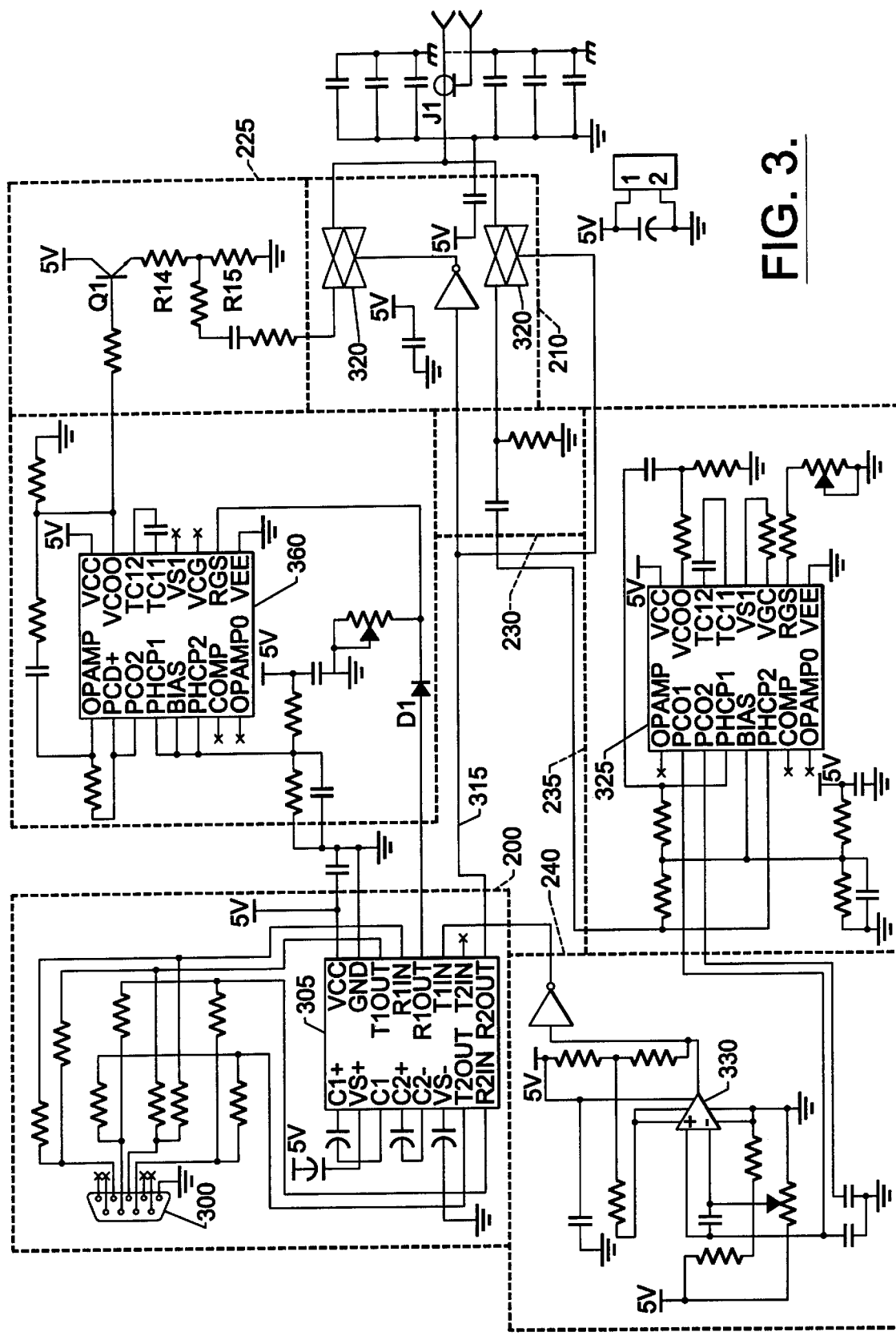
FIG. 3 is a schematic diagram of an exemplary embodiment of a cable transfer interface according to the present invention.

FIG. 3 is a schematic diagram of an exemplary embodiment of a cable transfer interface according to the present invention. According to FIG. 3, data is transmitted to/from the cable transfer interface 110, 115 via connector 300. The data is converted to/from CMOS voltage levels from/to RS-232 voltage levels by an interface format chip 305 such as a MAX232CWE marketed by Maxim, Inc. The CMOS level data is processed by the FSK modulator 310 to provide a transmit modulated data signal. The FSK modulator 310 may be a Monolithic PLL XR0215ACD marketed by Exar, Inc.

The transmit modulated data signal is driven over the transmission line 130 by the transmit interface 225. The transmit interface 225 includes a transistor Q1 and resistors R14 and R15 in an emitter follower configuration. The emitter follower configuration allows the transmit interface to drive the transmit modulated data signal over the transmission line 130 up to 200 feet at an impedance in the range of about 25 ohms to 75 ohms.

The transmit modulated data signal is provided to a switch 320 which couples the transmit modulated data signal to the transmission line 130 during a transmit operation. The switch 320 may be an analog switch PI5A383AW marketed by Pericom, Inc. The switch 320 also couples data from the transmission line 130 to FSK demodulator 325 via the receive interface 230 during a receive operation to provide the receive modulated data signal. The direction of the switch 320 is controlled by an RTS signal generated at pin 9 of the interface format chip 305. For example, the RTS signal indicates that a device is ready to send data. Accordingly, the direction of the switch 320 is set to receive data from the device sending the RTS signal.

The FSK demodulator 325 demodulates the receive modulated data signal to provide a demodulated data signal. The FSK demodulator 325 may be a Monolithic PLL XR0215ACD marketed by Exar, Inc. The demodulated data signal may have an amplitude of about 200 mV.

The demodulated data signal is compared to a reference voltage (controlled by potentiometer R32) by the comparator 330. The comparator 330 shifts the voltage level of the demodulated data signal to CMOS voltage levels to provide the receive format data signal. The comparator 330 may be a Voltage Comparator LM311M marketed by National Semiconductor, Inc. The receive format data signal is provided to the interface format chip 305 for conversion to RS-232 voltage levels upon which data is transmitted over the connector 300.

Accordingly, cabling installed in houses can be used to transfer data between devices, such as PCs and set top boxes. For example, existing cabling can be used to connect a PC with a set top box, thereby allowing data to be transferred between the set top box and the PC. Moreover, the data transfer does not interfere with the television signal conducted over the same cable. The cabling can be installed in the floors and walls of the house, thereby making the connection between the devices less cumbersome and less expensive than adding a dedicated cable between the devices.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of transferring data over a television signal transmission line comprising the step of transferring the data between a personal computer and a set top box over the television signal transmission line using frequency shift keying modulation in a frequency range that is not within a television signal frequency range to simultaneously conduct the television signal and the data over the television signal transmission line, wherein the step of transferring comprises the steps of:

converting an interface format data signal to an internal format data signal;

generating a modulated data signal at a frequency based on information included in the internal format data signal;

driving the modulated data signal to compensate for a characteristic impedance of the television signal transmission line to provide a buffered modulated data signal; and setting a switch direction that electrically couples the buffered modulated data signal to the television signal transmission line.

2. The method of claim 1, wherein the step of transferring comprises the step of receiving the data from the television signal transmission line which simultaneously conducts a television signal.

3. The method of claim 1, wherein the step of transferring comprises the steps of:

generating a modulated data signal at a frequency that is based on information included in the data; and transmitting the modulated data signal from the personal computer to the set top box over the television signal transmission line.

4. A method of transferring data over a television signal transmission line comprising the step of transferring the data between a personal computer and a set top box over the television signal transmission line using frequency shift keying modulation in a frequency range that is not within a television signal frequency range to simultaneously conduct the television signal and the data over the television signal transmission line; and wherein the step of transferring comprises the step of receiving the data from the television signal transmission line which simultaneously conducts a television signal, wherein the step of receiving comprises the step of:

setting a switch direction that electrically couples the data from the television signal transmission line to provide a buffered modulated data signal;

receiving the buffered modulated data signal to compensate for a characteristic impedance of the television signal transmission line;

generating an internal format data signal from the buffered modulated data signal using frequency shift keying demodulation based on a frequency of the buffered modulated data signal; and converting the internal format data signal to an interface format data signal.

5. The method of claim 1, wherein the step of transferring comprises the step of transferring the data from a first device in a residence to a second device in the residence.

6. The method of claim 1, wherein the step of transferring comprises the step of transferring data over a coaxial cable.

7. A cable transfer interface circuit that transmits data from a data interface over a television signal transmission line during a transmit operation and that provides data from the television signal transmission line to the data interface during a receive operation, the cable transfer interface circuit comprising:

a converter that converts a first personal computer voltage level interface format data signal from the data interface to a transmit voltage level format data signal during the transmit operation;

a transmitter, responsive to the converter, that provides a transmit modulated data signal based on the transmit voltage level format data signal using frequency shift keying during the transmit operation in a frequency range that is not within a television signal frequency range used to conduct the television signal over the television signal transmission line;

a switch, responsive to the transmitter, that electrically couples the transmit modulated data signal to the television signal transmission line during the transmit operation;

wherein the switch electrically couples data from the television signal transmission line to provide a receive modulated data signal during the receive operation;

a receiver, responsive to the switch, that provides a receive voltage level format data signal based on the receive modulated data signal to the converter interface during the receive portion using frequency shift keying demodulation in the frequency range that is not within the television signal frequency range used to conduct the television signal over the television signal transmission line; and wherein the converter converts the receive voltage level format data signal to a second personal computer voltage level interface format data signal during the receive operation.

8. The cable transfer interface circuit of claim 7, wherein the transmitter comprises:

a frequency shift keying modulator that generates a modulated data signal based on information included in the first personal computer interface format data signal; and a transmit interface, responsive to the frequency shift keying modulator, that transmits the transmit modulated data signal over the television signal transmission line via the switch based on the modulated data signal, wherein the television signal transmission line has an impedance in a range between about 75 ohms and 25 ohms.

9. The cable transfer interface circuit of claim 7, wherein the receiver comprises a receive interface that receives data from the television signal transmission line to provide a modulated data signal;

a frequency shift keying demodulator, responsive to the receive interface, that demodulates the modulated data signal to provide a demodulated data signal; and a level shifter, responsive to the frequency shift keying demodulator, that shifts a voltage level of the demodulated data signal to provide the receive format data signal.

10. The cable transfer interface circuit of claim 7, wherein the television signal transmission line is a coaxial cable.

11. The cable transfer interface circuit of claim 7, wherein the transmitter is located in a building, and wherein data is transmitted over the television signal transmission line to a device in the building.

12. The cable transfer interface circuit of claim 7, wherein the frequency range is between about 800 KHz and 1 MHz.

* * * * *